US012363586B2

(12) United States Patent
Lehti et al.

(10) Patent No.: US 12,363,586 B2
(45) Date of Patent: Jul. 15, 2025

(54) DATA TRANSMISSION VIA FREQUENCY INTERLACE FOR WIRELESS NETWORKS

(71) Applicant: NOKIA TECHNOLOGIES OY, Espoo (FI)

(72) Inventors: Arto Lehti, Massy (FR); Kari Pekka Pajukoski, Oulu (FI); Karri Markus Ranta-Aho, Espoo (FI); Mark Cudak, Rolling Meadows, IL (US); Rapeepat Ratasuk, Inverness, IL (US); Oskari Tervo, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 376 days.

(21) Appl. No.: 17/793,842

(22) PCT Filed: Jan. 20, 2020

(86) PCT No.: PCT/US2020/014259
§ 371 (c)(1),
(2) Date: Jul. 19, 2022

(87) PCT Pub. No.: WO2021/150199
PCT Pub. Date: Jul. 29, 2021

(65) Prior Publication Data
US 2023/0047193 A1 Feb. 16, 2023

(51) Int. Cl.
*H04W 28/06* (2009.01)
*H04W 72/23* (2023.01)
*H04W 72/543* (2023.01)

(52) U.S. Cl.
CPC ........... *H04W 28/06* (2013.01); *H04W 72/23* (2023.01); *H04W 72/543* (2023.01)

(58) Field of Classification Search
None
See application file for complete search history.

(56) References Cited

U.S. PATENT DOCUMENTS 10,505,688 B2 * 12/2019 Bendlin ............... H04B 7/0617
11,064,456 B2 * 7/2021 Tang .................... H04W 68/005
(Continued)

FOREIGN PATENT DOCUMENTS

CN 110226351 A * 9/2019 ........... H04L 5/0048
EP 2 056 500 A1 5/2009
(Continued)

OTHER PUBLICATIONS

"3rd Generation Partnership Project; Technical Specification Group Radio Access Network; Study on NR-based access to unlicensed spectrum (Release 16)", 3GPP TR 38.889, V16.0.0, Dec. 2018, pp. 1-119.
(Continued)

*Primary Examiner* — Jay P Patel
(74) *Attorney, Agent, or Firm* — Lippes Mathias LLP

(57) ABSTRACT

According to an example embodiment, an example method may include determining, by a network node in a wireless network, whether a size of a data packet is greater than a threshold size; transmitting, by the network node, the data packet via a frequency interlace if the size of the data packet is less than or equal to the threshold size; transmitting, by the network node, the data packet via contiguous wideband frequency resources if the size of the data packet is greater than the threshold size.

18 Claims, 9 Drawing Sheets

(56) References Cited

U.S. PATENT DOCUMENTS

| | | | | |
|---|---|---|---|---|
| 2008/0166974 | A1* | 7/2008 | Teo | H04L 27/0006 |
| | | | | 455/67.11 |
| 2010/0177715 | A1* | 7/2010 | Ofuji | H04W 72/23 |
| | | | | 370/329 |
| 2017/0289993 | A1 | 10/2017 | Yerramalli et al. | |
| 2021/0083750 | A1* | 3/2021 | Mohiuddin | H04B 7/0639 |
| 2021/0199754 | A1* | 7/2021 | Murakami | H04B 7/06 |
| 2021/0266111 | A1* | 8/2021 | Kusashima | H04L 1/1896 |
| 2021/0266881 | A1* | 8/2021 | Kusashima | H04W 52/0225 |
| 2021/0307072 | A1* | 9/2021 | Kusashima | H04W 72/0453 |

FOREIGN PATENT DOCUMENTS

| | | | | |
|---|---|---|---|---|
| EP | 2 056 502 A1 | 5/2009 | | |
| WO | WO-2017176438 A1 * | 10/2017 | | H04W 48/10 |
| WO | WO-2020090548 A1 * | 5/2020 | | H04W 16/14 |

OTHER PUBLICATIONS

"Revised WID: Support of NR Industrial Internet of Things (IoT)", 3GPP TSG RAN Meeting #84, RP-191561, Agenda Item: 9.4.14, Nokia, Jun. 3-6, 2019, 6 pages.

"SID update: Study on Channel Modeling for Indoor Industrial Scenarios", 3GPP TSG-RAN Meeting #82, RP-182862, Agenda Item: 9.3.13, Ericsson, Dec. 10-13, 2018, 5 pages.

"IEEE 802.11ad", Wikipedia, Retrieved on Dec. 17, 2023, Webpage available at : https://en.wikipedia.org/wiki/IEEE_802.11ad.

"IEEE 802.11ay", Wikipedia, Retrieved on Dec. 17, 2023, Webpage available at : https://en.wikipedia.org/wiki/IEEE_802.11ay.

"Single-carrier FDMA", Wikipedia, Retrieved on Dec. 8, 2023, Webpage available at : https://en.wikipedia.org/wiki/Single-carrier_FDMA.

Invitation to Pay Additional Fees received for corresponding Patent Cooperation Treaty Application No. PCT/US2020/014259, dated Aug. 6, 2020, 12 pages.

Office Action received for corresponding European Patent Application No. 20705589.8, dated Oct. 26, 2023, 6 pages.

International Search Report and Written Opinion dated Sep. 28, 2020 corresponding to International Patent Application No. PCT/US2020/014259.

IPWireless, "Scheduler Architecture for LTE DL," 3GPP Draft; R2-060881, 3GPP TSG RAN WG2 #52, Athens, Greece, 27-31, Mar. 2006, Mar. 23, 2006, XP050130826.

* cited by examiner

DATA TRANSMISSION VIA FREQUENCY INTERLACE FOR WIRELESS NETWORKS

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include determining, by a network node in a wireless network, whether a size of a data packet is greater than a threshold size; transmitting, by the network node, the data packet via a frequency interlace if the size of the data packet is less than or equal to the threshold size; and transmitting, by the network node, the data packet via contiguous wideband frequency resources if the size of the data packet is greater than the threshold size.

According to another example embodiment, a method may include determining, by a user device, a size of a data packet for uplink transmission; sending, by the user device to a base station, information identifying the size of the data packet for uplink transmission; receiving, by the user device from the base station if the size of the data packet for uplink transmission is less than or equal to a threshold size, downlink control information instructing the user device to use a frequency interlace for the uplink transmission, the frequency interlace including a plurality of distributed frequency resource portions; otherwise, receiving, by the user device from the base station if the size of the data packet for uplink transmission is greater than the threshold size, downlink control information identifying a contiguous wideband frequency resources allocated to the user device; and transmitting, by the user device, the data via either the frequency interlace or the contiguous wideband frequency resources, based on the size of the data packet.

According to another example embodiment, a method may include determining, by a user device within a wireless network, a plurality grant free resources, including grant free resources that may be used for uplink transmission via at least one frequency interlace, wherein each of that at least one frequency interlace includes a plurality of distributed frequency resource portions; determining, by the user device, whether a size of a data packet for uplink transmission would fit within grant free resources of a frequency interlace of the at least one frequency interlace; transmitting, by the user device to a base station, the data packet via the frequency interlace of the at least one frequency interlace, if the size of the data packet would fit within grant free resources of the frequency interlace; otherwise, transmitting, by the user device to the base station, a scheduling request to request resources for uplink transmission of the data packet, if the size of the data packet would not fit within grant free resources of the frequency interlace.

According to another example embodiment, a method may include performing the following, by a network node in a wireless network, if a size of a data packet for transmission is not greater than a threshold size: transmitting the data packet, via a plurality of distributed frequency resource portions of a frequency interlace, during a scheduling period; otherwise, if the size of the data packet is greater than the threshold size, then performing the following, by the network node: segmenting the data packet into a plurality of packet segments; and transmitting each packet segment, of the plurality of packet segments, via the plurality of distributed frequency resource portions of the frequency interlace, during a corresponding scheduling period.

Other example embodiments are provided or described for each of the example methods, including: means for performing each of the example methods; a non-transitory computer-readable storage medium comprising instructions stored thereon that, when executed by at least one processor, are configured to cause a computing system to perform any of the methods; and an apparatus including at least one processor; and at least one memory including computer program code; the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

DETAILED DESCRIPTION

Figure 1:
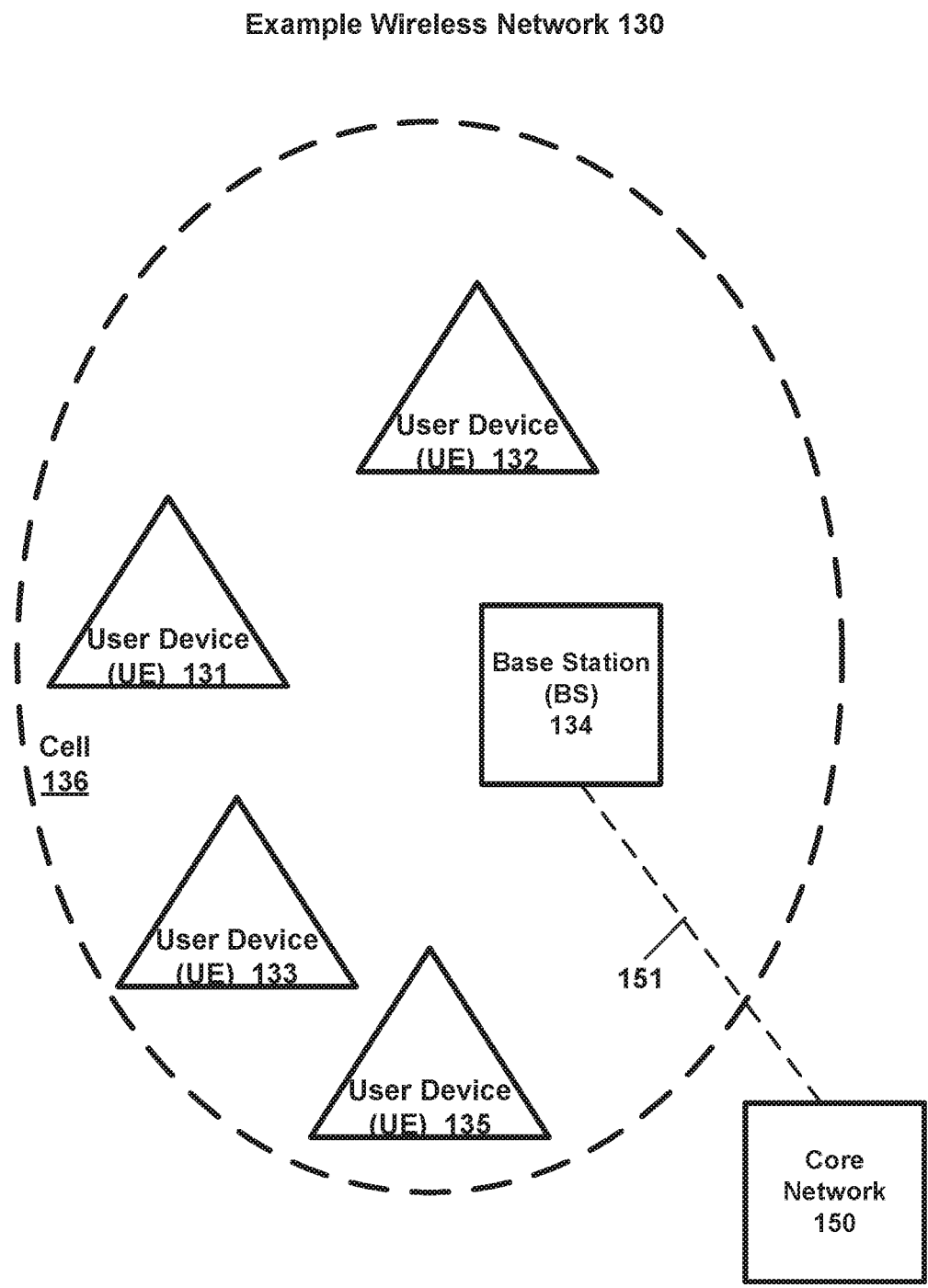
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or Narrow Band IoT (NB-IoT) user devices, enhanced mobile broadband (eMBB), and ultra-reliable and low-latency communications (URLLC). Many of these new 5G (NR)— related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate (BLER) than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

Network nodes (e.g., BSs or gNBs, UEs or user devices, relay stations or relay nodes, or other network node) may use beamforming, in which a set of antenna weights may be applied to generate a specific antenna beam width and shape for transmitting or receiving (e.g., in order to obtain a beamforming gain), instead of using an omnidirectional antenna. An antenna (or antenna array) may include multiple antenna elements, where a specific beam (e.g., including a beam direction and/or beam width) may be generated or obtained by applying a set of antenna weights (e.g., each antenna weight including an amplitude and phase) to the antenna array, with a different weight applied to each antenna element. For example, a direction of the beam from a phased antenna array may be changed by adjusting the phase of the signal applied to each of the elements in the antenna array. Thus, for example, a transmit beam may be generated for transmitting a signal, and a receive beam may be generated for receiving a signal.

According to an example embodiment, various wireless nodes or network nodes (e.g., UEs or user devices, BSs, gNBs, eNBs) may be operating within wireless networks that may use radio (wireless) spectrum that is shared by multiple radio access technologies (RATS). For example, one or more gNBs and multiple UEs of 5G/New Radio (and/or LTE) radio access technology (RAT) may share wireless spectrum with one or more WiFi/WiGig networks (e.g., WiFi/WiGig Access Points or base stations, and WiFi/WiGig clients or Wi-Fi/WiGig UEs). In some cases, for example, operation in unlicensed spectrum may be regulated by the certain channel access rules that may target fair spectrum usage among different RATs on the same shared unlicensed spectrum. The rules may require for example, at least in some cases, e.g., that wireless nodes should perform channel sensing (or otherwise determine that the channel is unoccupied), which may also be referred to as listen-before-talk (LBT) or channel access, before transmitting on the channel. Channel sensing may include, for example, sensing whether a channel is occupied (or not) by another wireless device or wireless node. Channel sensing may include, for example, detecting an energy level of a channel, and comparing the detected energy level to a threshold, where an energy level less than or equal to the threshold indicates that the channel is unoccupied (and may be used or transmitted on), while an energy level greater than the threshold may indicate that the channel is occupied (e.g., indicating that another device is transmitting on the channel). Also, according to an example embodiment, in a beam-based operation, channel sensing or LBT (listen before talk) may likely be performed in the intended transmit direction, e.g., the transmitter (transmitting device or node) may perform channel sensing or LBT using the beam it intends to use for the scheduled/planned transmission. Thus, channel sensing may be performed per beam or in a directional manner, for example. Thus, a device or wireless node may apply a receive beam for channel sensing and then apply the same beam as a transmit beam to transmit a signal if the channel is unoccupied, as an illustrative example.

Also, for example, in LBT, the node that wants to transmit data may typically listen (or perform channel sensing) to the transmission medium for a while to confirm the availability of the medium. Usually LBT procedure may include some fixed defer period and random length contention window (CW). After the node senses medium to be available, it starts a procedure where the node first waits for the fixed defer period and then picks a random timer value based on contention window maximum length parameters, for example. For example, the timer may be counted down when the medium is sensed free. After the times reaches zero the node can start transmission, according to an illustrative example.

There are several higher frequency bands for NR, which require use of highly directional beamforming to achieve adequate coverage. In such scenario different UE's signals may have some spatial isolation allowing spatial re-use which increases network capacity. However, the benefits and techniques related to the spatial re-use may depend on the channel access method chosen.

IOT, such as, for example, Industrial IoT, may involve the transmission of data packets that may be relatively small and can be transmitted sparsely.

One example higher frequency band for unlicensed operation is 60 GHz band. This band may be widely available in most countries and has very high bandwidth, e.g., 14 GHz in USA. The band is already used by WLAN based technology, i.e., IEEE 802.11 AD and AY. AD is based on 2.16 GHz bandwidth, whereas AY uses aggregation of AD bands to achieve even higher bandwidths.

The efficiency of the power amplifiers becomes lower in high frequency bands. Hence, it may be desirable to have a low PAPR (Peak to Average Power Ratio) waveform to improve the efficiency. One way to achieve a low PAPR is to use a single carrier type of transmission, such as DFT-S-OFDM (Discrete Fourier Transform-Spread-Orthogonal Frequency Division Multiplexing) signal for transmission.

However, in many cases, performing LBT or channel sensing may introduce significant delay, before the network node (e.g., UE or BS or gNB) may transmit via the channel.

Also, in some cases, unlicensed bands have a requirement for the occupied bandwidth, which may be 70% (or other bandwidth percentage) for the 60 GHz NR unlicensed band, as an illustrative example. For example, this bandwidth occupation requirement for a signal transmission may be provided, e.g., to facilitate different systems to reliably recognize (e.g., via channel sensing or LBT) if the band is occupied or in use by another network node. Bandwidth of NR unlicensed in 60 GHz band may be assumed to be very large (e.g., 2.16 GHz or other bandwidth), causing the fact that a single slot may have a relatively high number of physical layer resource elements (REs).

In an illustrative example, relatively small packets may be needed for (or transmitted by) the control and industrial IoT applications. Also, it may be inefficient to transmit small data packets via such large system bandwidths (e.g., 2.16 GHz). However large bandwidths may need to be used due to the channel occupancy requirements (e.g., requiring that a transmission occupy 70% of a bandwidth, or across a bandwidth, of the system bandwidth or BWP). In many cases, employing frequency multiplexing with a single carrier waveform is not straightforward and may be impractical, or even impossible in some cases. Another issue is that several UEs are not always available for scheduling. Thus, it may be difficult or impractical to efficiently schedule relatively small (e.g., IOT) data packets for transmission over the relatively large NR unlicensed band (e.g., 2.16 GHz system bandwidth), especially for single carrier transmission, which offers low PAPR, particularly when there is an occupied bandwidth requirement (e.g., 70%).

Therefore, according to an example embodiment, a network node (e.g., UE, user device, BS, gNB, or other network node) may transmit a data packet (or a portion of a data packet, e.g., a packet segment) via a frequency interlace. According to an example embodiment, the frequency interlace may include a plurality of distributed frequency resource portions. One or more frequency interlaces within a system bandwidth may be configured for use (transmission) by one or more network nodes.

Figure 2:
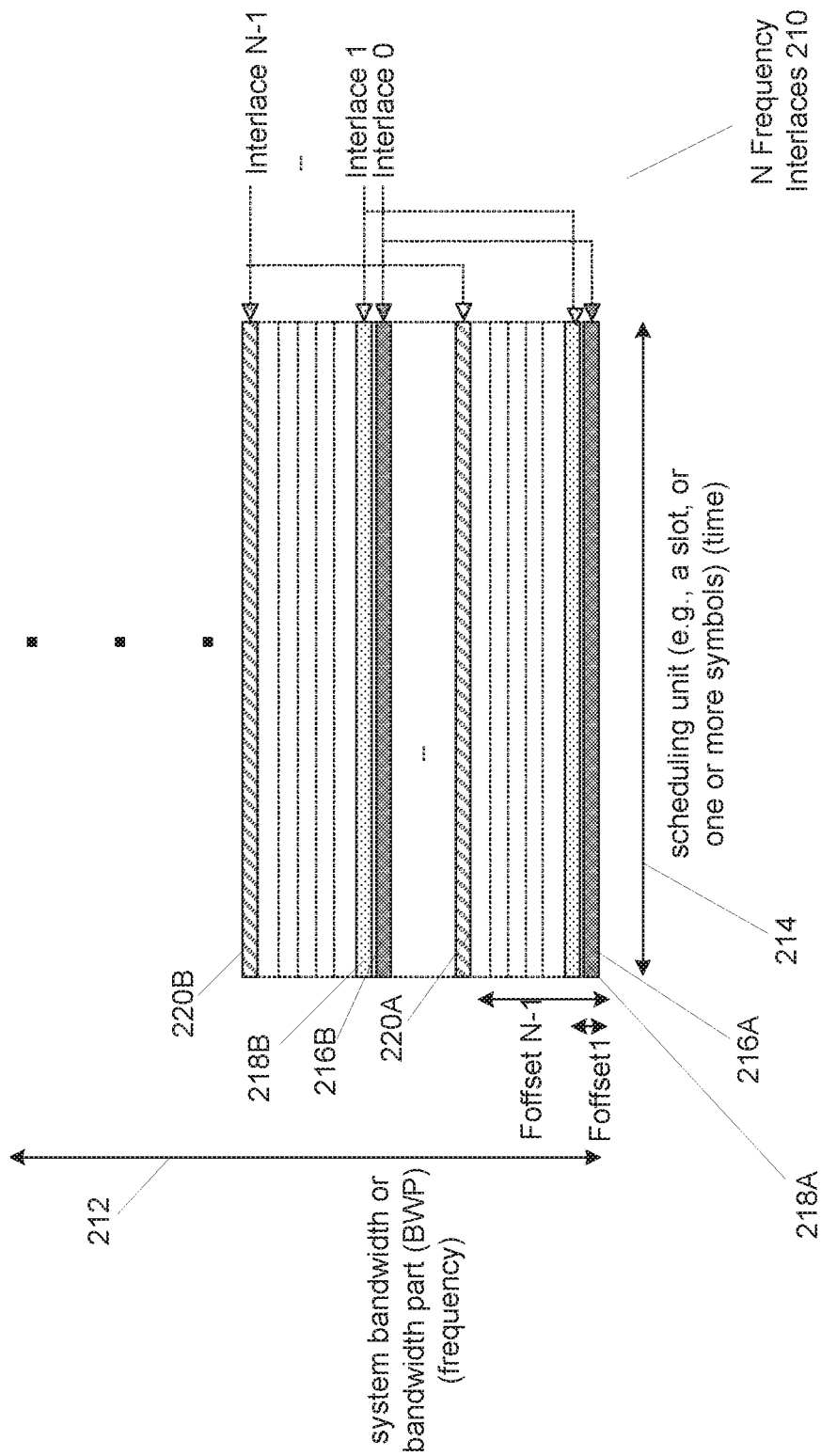
FIG. 2 is a diagram illustrating a plurality of frequency interlaces according to an example embodiment.

FIG. 2 is a diagram illustrating a plurality of frequency interlaces according to an example embodiment. As shown in FIG. 2, N frequency interlaces 210 are shown within a system bandwidth 212 (vertical axis) (or which may be a bandwidth part (BWP)), for a scheduling period 214 (time) (indicated on the horizontal axis). A scheduling period may include, for example, a plurality of symbols, or a slot (which may include a number of symbols, e.g., such as 7 symbols, or 14 symbols within a slot), or a plurality of slots, in the time domain. Three example frequency interlaces are shown among the N frequency interlaces 210, e.g., including frequency interlace 0, frequency interlace 1, ... and frequency interlace N−1, where N is an integer. While only three example frequency interlaces are shown in FIG. 2, any number of frequency interlaces may be provided. A frequency interlace may include a plurality of distributed frequency (or bandwidth) portions, where each frequency resource portion includes a set of frequency (or spectral or bandwidth) resources, e.g., where each frequency resource portion is provided at a different frequency (or provided at a different location within a bandwidth or frequency spectrum). For example, each frequency interlace may include M frequency resource portions, distributed across a system bandwidth 212 or bandwidth part. A system bandwidth may be configured to include a plurality (e.g., 5, 10, 20, 30, ... or other number) of frequency interlaces. As noted, each frequency interlace may include M (e.g., 10, 20, 25, 30, 40, ... or other number of) distributed resource portions.

As shown in the illustrative example in FIG. 2, frequency interlace 0 may include multiple (or a plurality of) distributed frequency resource (or bandwidth) portions, e.g., including frequency resource portions 216A, 216B, etc. Although not shown in FIG. 2, the frequency interlace 0 may include any number of frequency resource portions, for example, and may typically have more than two frequency resource portions, in order to include resources distributed across the system bandwidth 212 or a bandwidth part. Likewise, frequency interlace 1 may include frequency resource portions 218A, 218B, ..., which are distributed across the system bandwidth 212 (e.g., provided at different frequencies, across the system bandwidth 212). And, similarly, frequency interlace N−1 may include frequency resource portions 220A, 220B, etc., which may be distributed across the system bandwidth 212 or BWP.

Also, for example, each frequency interlace may include a frequency offset (Foffset) that indicates a frequency (e.g., an absolute frequency or a relative frequency with respect to a reference frequency, such as, for example, the beginning or lowest frequency of the system bandwidth) where a first frequency resource portion of a frequency interlace begins or is located within the system bandwidth 212 or BWP. For example, an Foffset0 (not shown in FIG. 2) may indicate a frequency (e.g., as an absolute frequency or a relative frequency with respect to a reference frequency) where the first frequency resource portion 216A, of frequency interlace 0, is located within system bandwidth 212 or BWP. Likewise, Foffset1 may indicate a frequency (e.g., an absolute frequency or a relative frequency with respect to a reference frequency) where a first (or lowest frequency resource portion) of frequency resource portion 218A, of frequency interlace 1, is provided or located. And, Foffset N−1 may indicate a frequency indicating a frequency or location of a frequency resource portion 220A, of frequency interlace N−1, is provided or located within the system bandwidth 212.

According to an example embodiment, a network node may transmit data or a data packet via either a frequency interlace, or via a contiguous wideband frequency resources. The contiguous wideband frequency resources may include frequency resources (or bandwidth) that may include the entire system bandwidth 212, a bandwidth part, or a contiguous portion of the system bandwidth 212, wherein the contiguous wideband frequency resources may be wider (or provide more frequency resources) than a sum or total frequency or bandwidth of the plurality of distributed frequency resources portions of a frequency interlace.

Thus, in some cases, the use of a contiguous wideband frequency resources for transmitting data may, for example, be especially suitable for transmission of larger data packets, since transmitting of a larger amount of data (more bits) may be efficiently transmitted on a larger or contiguous wideband frequency resources (e.g., without wasting a significant portion of the frequency resources of the system bandwidth or other contiguous wideband frequency resources), while satisfying the occupied bandwidth requirement (e.g., 70% of the system bandwidth).

On the other hand, as noted above, it may be very inefficient to transmit a small (e.g., IOT) data packet, e.g., using a single carrier signal type, via such a large set of frequency resources, such as via a contiguous wideband frequency resources (e.g., which may include the system bandwidth 212, a bandwidth part, or other significant contiguous set of frequency resources). This may be because, for example, the transmission capacity of the system bandwidth 212 (or other contiguous wideband frequency resources) over one scheduling period 210 (e.g., a slot or a plurality of symbols or a plurality of slots) may be much greater than is required to transmit one small (e.g., IOT) data packet, and it may be difficult to multiplex multiple small data packets over the single carrier signal, for example.

Therefore, according to an example embodiment, it may be more suitable and/or more efficient to transmit small data packets over a frequency interlace (e.g., over the plurality of distributed frequency resource portions of the frequency interlace). According to an example embodiment, the transmission of a small data packet (e.g., which may fit within a frequency interlace over one scheduling period) within a frequency interlace may include a number of technical features or technical advantages, e.g., including: 1) the frequency interlace, with smaller set of frequency resources overall, may provide a more efficient set of resources for transmitting a smaller data packet (as compared to using a larger set of contiguous wideband frequency resources), 2) frequency interlaces may be allocated or shared for different network nodes (e.g., for different UEs or different BSs/gNBs), and 3) a frequency interlace may provide frequency resource portions that are distributed over a significant portion of the system bandwidth 212, e.g., such that a occupied bandwidth requirement (e.g., requiring a transmission to be provided across resources of 70% of the system bandwidth) may still be met by such data transmission using the frequency interlace. Thus, for example, such as for unlicensed operation as an example, a frequency interlace may advantageously provide frequency resources that may be used more efficiently (as compared to the system bandwidth 212 or other large or contiguous wideband frequency resources) for smaller data packets, while still meeting, at least in some cases, the occupied bandwidth requirement for the transmission.

For example, according to an example embodiment, a network node (e.g., BS, gNB, user device or UE) may transmit a data packet via either a frequency interlace (e.g., for smaller data packets) or via a larger set of contiguous frequency resources (e.g., via contiguous wideband frequency resources) (e.g., for larger data packets), depending on the size of the data packet. Thus, according to an example embodiment, a network node may determine whether a size of a data packet is greater than a threshold size. The network node may then transmit the data packet via frequency resources (e.g., which are selected) based on whether the size of the data packet is greater than the threshold size, wherein the resources may include either a frequency interlace or contiguous wideband frequency resources. The network may indicate via the Downlink Control Information the resource indication including an indication of either a frequency interlace or a contiguous wideband frequency resource allocation. For example, a UE may indicate to the BS/gNB an amount of data to be transmitted (e.g., indicate a packet size of data for UL transmission). The BS/gNB may select either a frequency interlace, or a contiguous wideband frequency resource allocation for transmission of the data, e.g., depending on the amount (or size) of data in the UE's buffers for transmission (based on the packet size for transmission). The BS/gNB may then send an indication to the UE, e.g., via Downlink Control Information (DCI) (e.g., such as via the scheduling information provided within the DCI) or via higher layer signalling, of the resources for UL transmission allocated to the UE, which may include either an indication (identification) of resources of a frequency interlace or a contiguous wideband frequency resource allocation.

According to an example embodiment, the network node transmitting the data packet may include, e.g., performing the following, by the network node, if the size of the data packet is not greater than the threshold size: transmitting the data packet, via a plurality of distributed frequency resource portions of a frequency interlace, during a scheduling period; otherwise, if the size of the data packet is greater than the threshold size, then performing the following, by the network node: performing channel sensing to confirm that a channel is idle; and transmitting the data packet via contiguous wideband frequency resources during a scheduling period, wherein the contiguous wideband frequency resources are wider in frequency than a total frequency width of the plurality of frequency resource portions of the frequency interlace.

According to an example embodiment, the network node may also determine a configuration of the frequency interlace, wherein the frequency interlace includes the plurality of distributed frequency resource portions, each frequency resource portion provided at a different frequency location within a system bandwidth.

Also, according to an example embodiment, the transmitting the data packet, via the plurality of distributed frequency resource portions of the frequency interlace, may be performed via a beamformed transmission without first performing channel sensing (or LBT).

In another example embodiment, the network or a BS may configure a plurality of grant free resources that may be used for uplink transmission, including at least some grant free resources for at least one frequency interlace. Grant free resources may include, for example, a pool of contention-based resources, of which a UE may use for UL transmission of data, without sending a scheduling request and/or without waiting for an allocation of resources via a received scheduling grant, thereby reducing transmission latency at the UE. For example, resources of one or more frequency interlaces may be configured as part of the grant free resources. For example, a frequency interlace may be configured within a pool of grant free resources, or grant free resources may be specifically configured for one or more frequency interlaces.

Therefore, a UE may perform UL transmission of a data packet within grant free resources of a frequency interlace, if the size of the data packet is less than a threshold size (e.g., if the data packet fits within the grant free resources of the frequency interlace). Otherwise, if the data packet does not fit within the grant free resources of the frequency interlace, then the UE may send a scheduling request to obtain resources for UL transmission, and may indicate a size of the data packet for transmission.

Thus, for example, a method may include determining, by a UE within a wireless network, a plurality grant free resources, including grant free resources that may be used for uplink transmission via at least one frequency interlace, wherein each of the at least one frequency interlace includes a plurality of distributed frequency resource portions; determining, by the UE, whether a size of a data packet for uplink transmission would fit within grant free resources of a frequency interlace of the at least one frequency interlace; transmitting, by the UE to a base station, the data packet via the frequency interlace of the at least one frequency interlace, if the size of the data packet would fit within grant free resources of the frequency interlace; otherwise, transmitting, by the UE to the base station, a scheduling request to request resources for uplink transmission of the data packet, if the size of the data packet would not fit within grant free resources of the frequency interlace (e.g., or the size of the data packet is greater than the threshold size).

In another example embodiment, a network node (e.g., UE, user device, BS, gNB, or other network node) may transmit a data packet via the plurality of distributed frequency resources of a frequency interlace over (or during) one or more scheduling periods. For example, the number of scheduling periods used for the data transmission may be based on, or may be depend on, the size of the data packet to be transmitted. If the data packet is larger than a threshold (e.g., larger than an amount of data that may be transmitted within the frequency interlace during one scheduling period, then the data packet may be divided or segmented into multiple (or a plurality of) portions or packet segments. Each packet segment may then be transmitted via the frequency interlace over or during a corresponding scheduling period, e.g., a first packet segment of the data packet transmitted via the frequency interlace during a first scheduling period, a second packet segment of the data packet transmitted via the frequency interlace during a second scheduling period, etc.

According to an example embodiment, such an example embodiment or approach may be used by a UE that may be, for example, located near a cell edge or otherwise power limited. In such a case, in order to increase or improve the signal to interference plus noise ratio (SINR) or SNR of a signal transmitted by the UE (and/or received by a BS/gNB), the data packet may be divided into a plurality of packet segments or smaller sub-packets, where each packet segment may be transmitted by the UE (or other network node) via the frequency interlace during a corresponding scheduling period. The smaller packet transmission may provide improved SINR, as compared to transmitting the larger data packet. Thus, segmenting the data packet into a plurality of packet segments, and transmitting the packet segments via frequency interlace on corresponding scheduling periods may improve transmission performance for the UE, e.g., increase SINR for the received signal.

Therefore, according to an example embodiment, a network node may perform the following: determine, by a network node in a wireless network, whether a size of a data packet is greater than a threshold size; perform the following, by the network node, if the size of the data packet is not greater than the threshold size: transmit the data packet, via a plurality of distributed frequency resource portions of a frequency interlace, during a scheduling period; otherwise, if the size of the data packet is greater than the threshold size, then perform the following, by the network node: segment the data packet into a plurality of packet segments; and transmit each packet segment, of the plurality of packet segments, via the plurality of distributed frequency resource portions of the frequency interlace, during a corresponding scheduling period. Further illustrative examples and embodiments will be described.

According to an example embodiments, various techniques are provided that may use procedures to transmit small (e.g., less than a threshold in size) packets in high band NR (New Radio/5G) unlicensed band (as an illustrative example) to improve efficiency, reliability and latency while keeping or satisfying requirement for the occupied bandwidth. According to an example embodiment, a frequency interlace may be used for transmission of packets small enough to fit within the frequency interlace (e.g., for one scheduling period) to thereby improve channel access isolation without necessarily requiring use of channel sensing/LBT.

According to an example embodiment, a single carrier transmission signal may be used, such as, e.g., SC-FDMA (or DFT-S-OFDM) with distributed or clustered subcarrier mapping. Also, other signal types or methods may be used. For larger packets (e.g., greater in size that a threshold size) the whole transmission bandwidth, system bandwidth or BWP may be used for data transmission, e.g., after performing channel sensing or LBT. Techniques, such as using a frequency interlace, may also be used for cell edge UEs by splitting or segmenting the packets small enough to fit within the frequency interlace and e.g., via one scheduling period (or other number of scheduling periods). Frequency interlaces may be coordinated among network nodes (e.g., BSs, gNBs, eNBs).

One example problem is that a large bandwidth is often provided in or for high frequency bands, and may provide a very inefficient set of resources for the transmission of small data packets, e.g., as this may result in a significant amount of unused frequency resources when transmitting a small packet. Hence, in an illustrative example embodiment, the bandwidth (e.g., system bandwidth or BWP) may be split into smaller portions using frequency interlaces, where each frequency interlace may include a plurality of distributed frequency resource portions. There may be, for example, N frequency interlaces within the system bandwidth, and each frequency interlace (or at least a first or initial frequency resource portion of the frequency interlace) may have a frequency offset parameters of Foffset.

For example, if a single carrier transmission signal, such as DFT-S-OFDM, with distributed subcarrier mapping is used, each frequency interlace may include single subcarrier size pieces, i.e., every Nth subcarrier is belonging to a specific or different frequency interlace. Thus, in such an example, each frequency resource portion of a frequency interlace may be a subcarrier. Alternatively, a clustered subcarrier mapping, may be used in which each frequency resource portion (of an interlace) may include a group or cluster (e.g., a plurality) of subcarriers. If clustered subcarrier mapping is used, each cluster (i.e. interlace) may include one or more PRBs (physical resource block), e.g., which may include 12 (or other number of) subcarriers. Thus, in such an example, each frequency resource portion may include one or more PRBs, e.g., where each PRB may include 12 (or other number) of subcarriers. DFT-S-OFDM signal type may be used for high frequency bands, and, e.g., may have the advantage of single carrier property, but other signal transmission types may be used as well, e.g., such as a PRB interlace and OFDM (orthogonal frequency division multiplexing). Thus, a multicarrier signal type (e.g., OFDM) may alternatively be used, e.g., in which one or more subcarriers and/or one or more PRBs may be allocated as a frequency resource portion of each frequency interlace. For example, frequency interlaces may be coordinated among network nodes (e.g., among BSs, eNBs, gNBs or other network nodes), for example, so that each gNB or BS (or other network node) uses different frequency interlaces (e.g., having a different frequency offset parameter). Hence BSs or gNBs in the network may (or may need to be) grouped and coordination done within the group.

As noted above, channel access for (e.g., 60 GHz) unlicensed bands (or other shared access bands) may needs to be designed. One possible way is using directional LBT (e.g., channel sensing via directional beam), but LBT/channel sensing may typically introduce a non-trivial latency and may create an additional source of unreliability (e.g., possible signal collisions). One example technique may include beamforming to perform channel access, e.g., via spatial reuse. However, in a number of cases, beamforming alone may not provide sufficient isolation for different node transmissions, e.g., such as for the transmission of small data packets. Thus, according to an example embodiment, a frequency interlace may be used (e.g., either with or without beamforming/data transmission using a transmit beam) to provide (additional) signal protection and/or channel access, e.g., by allocating different frequency interlaces (each with a different frequency offset so as they do not collide between network nodes) to different network nodes, for example. For example, relatively small data packets, e.g., generated by control and/or industrial IoT applications, which both require reliable transmissions with low latency, may be transmitted via the frequency interlaces.

According to an example embodiment, a decision as to whether or not to use a frequency interlace for transmission, or to use a contiguous wideband frequency resources for transmission may be based on comparing the data packet size to a threshold size. Also, in other example embodiment, a decision as to whether a data packet may be transmitted via a frequency interlace during one scheduling period, or to segment the data packet into multiple packet segments to be transmitted via the frequency interlace over multiple scheduling periods may also be based on comparing the size of the data packet to a threshold size. For example, the threshold size may be or may be based on an amount of data that may be transmitted within the plurality of distributed frequency resources portions of a frequency interlace in one scheduling period for a target code rate, for example. Thus, for example, selection of the method or techniques to be used for transmission may be performed by comparing the packet size to threshold size_thres.

An example size threshold value size_thres (e.g., which may indicate an amount of data, or size data packet, that may be transmitted within the plurality of distributed frequency resource portions of a frequency interlace in one scheduling period for a target code rate) may be determined or calculated based on the following, by way of an illustrative example:

$$size_{thres} = CR_{trgt}[(N_{symb}N_{sc}N_{res} - N_{rs})N_{bits\_per\_symb}],$$
where $CR_{trgt}$ is target code rate;
$N_{symb}$ is number of PDSCH (e.g., downlink data channel) symbols in a scheduling period;
$N_{sc}$ is number of subcarriers allocated in each frequency resource portion of the frequency interlace;
$N_{res}$ is number of frequency resource portions in each frequency interlace;
$N_{rs}$ is number of resource elements allocated to reference symbols in the scheduling period in all the frequency resource portions of the frequency interlace;
$N_{bits\_per\_symb}$ is number of bits per modulation symbol;

For example, the target code rate may be equal to one if maximum packet size is desired or lower if additional coding gain is desired or seen a necessary. Packet size may, for example, include a cyclic redundancy check (CRC). An example scheduling period can one or more symbols, such as a 14 symbol slot or other length scheduling period.

The various example embodiments and techniques described herein (e.g., which may include transmitting of data via a frequency interlace in some situations) may be performed both in the uplink direction (e.g., UE transmission of data via frequency interlace) and/or in the downlink direction (e.g., BS/gNB transmission of data to UE via a frequency interlace). In the downlink, data may be transmitted to multiple UEs, e.g., where a different frequency interlace may be used to transmit to each UE or to two different UEs, for example. Or a different frequency interlace may be assigned to different BSs/gNBs. In the uplink, a different frequency interlace may be assigned to each UE, within a wireless network, for a scheduling period(s).

Also, according to an example embodiment, a configuration of a frequency interlace(s) may be determined by a network node (e.g., UE, user device, BS, gNB, or other network node). Determining a configuration of a frequency interlace may include one or more of a variety of steps or operations, depending on the situation and/or depending on the type of network node (e.g., UE or BS/gNB). Thus, determining a configuration of a frequency interlace may include receiving, by the network node from another network node, information identifying the configuration of the frequency interlace or information indicating one or more parameters of the configuration of the frequency interlace. Or, determining a configuration of a frequency interlace may include sending, by the network node (e.g., BS) to a user device/UE (and/or receiving by the user device/UE), information identifying either a configuration (e.g., a control information, or configuration indication, that indicates configuration 1, configuration 2, configuration 3 of a frequency interlace) of the frequency interlace or information indicating one or more parameters of the configuration of the frequency interlace. For example, the configuration of the frequency interlace may be sent from a BS/gNB to a UE using Downlink Control Information or higher-layer signaling. Or, in the case where the network node is a BS or gNB, the determining a configuration of a frequency interlace may include selecting, by the BS or gNB, the configuration of the frequency interlace, of a plurality of frequency interlace configurations. Also, network nodes may coordinate (e.g., send a message from a first BS to a second BS, with a proposed configuration, and receive a reply confirming the proposed configuration or with another proposed configuration of a frequency interlace) of a configuration of a frequency interlace. According to an example embodiment, a configuration of a frequency interlace may specify or indicate one or more frequency interlace parameters, e.g., such as one or more of: a number of frequency interlaces, a frequency offset (Foffset) of each frequency interlace (e.g., which may indicate a starting frequency of a first frequency resource portion of a frequency interlace); $N_{sc}$—a frequency width or bandwidth of each frequency resource portion, which may be indicated as a number of subcarriers allocated in each frequency resource portion of the frequency interlace; $N_{res}$—a number of frequency resource portions in each frequency interlace; $N_{rs}$—a number of resource elements allocated to reference symbols in the scheduling period in all the frequency resource portions of the frequency interlace; a frequency spacing between frequency resource portions of a frequency interlace; and/or other parameter related to a frequency interlace configuration.

Figure 3:
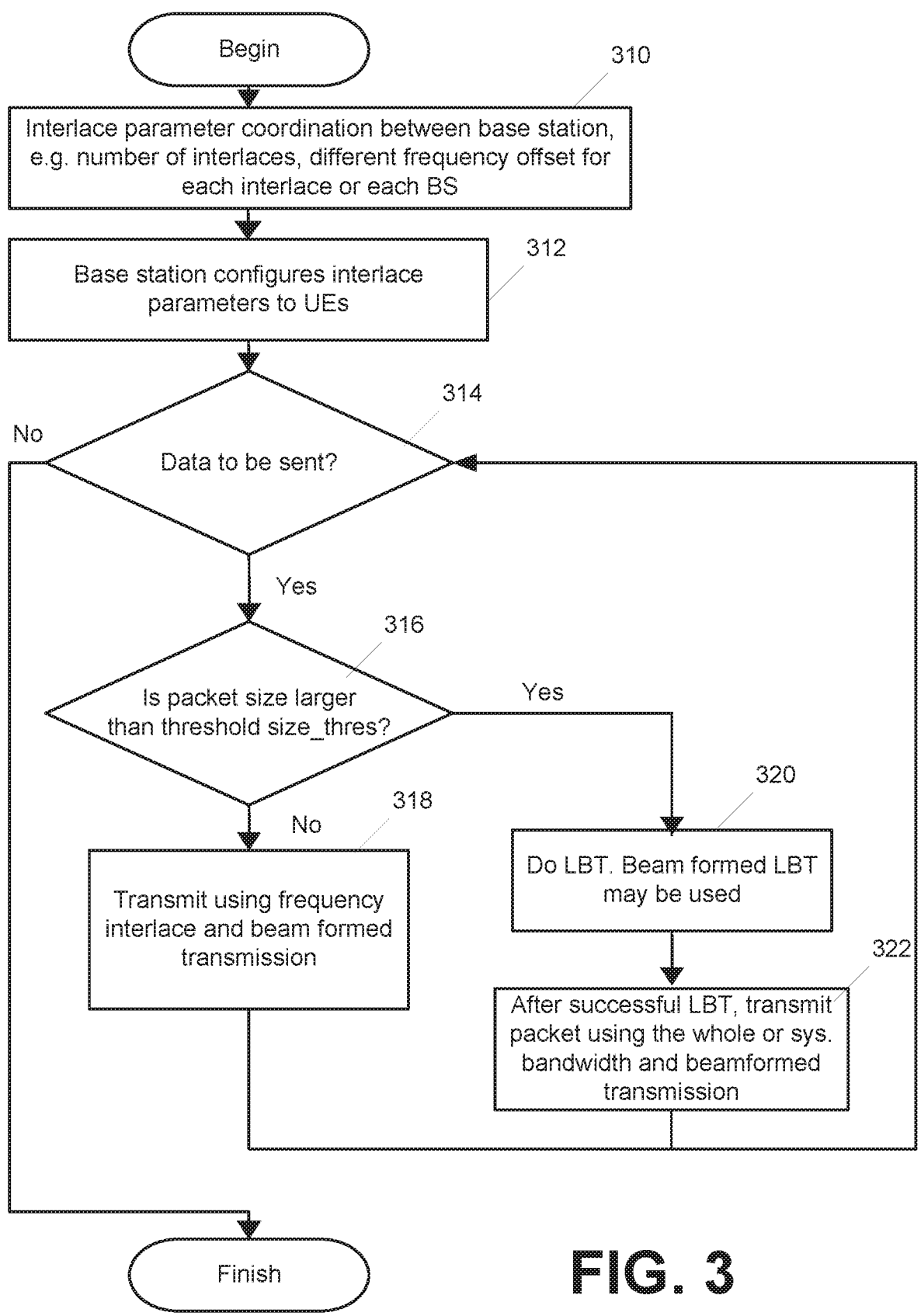
FIG. 3 is a flow chart illustrating operation of a network node according to an example embodiment.

FIG. 3 is a flow chart illustrating operation of a network node according to an example embodiment. At 310, the frequency interlace parameters may be coordinated among network nodes (e.g., among BSs or eNBs). Or, the BS/gNB may select a frequency interlace configuration among a plurality of possible frequency interlace configurations. At 312, if the network node is a BS/gNB, the network node (e.g., BS/gNB) sends to a UE the frequency interlace configuration. At 314, the network node determines if there is a data packet to be transmitted. If so, then the network node can determine what resources may be used for transmission and/or in what manner the data can or should be transmitted.

At 316, the network node may compare the size of the data packet to a size threshold. If a size of the data packet is not greater than the size threshold (e.g., the data packet can be transmitted within a frequency interlace during one scheduling period, based on the code rate and other parameters of the frequency interlace), then the flow proceeds to block 318. At 318, the network node transmits the (small) data packet via a transmit beam (using beamforming) and via the plurality of distributed resource portions of the frequency interlace (e.g., for one scheduling period). Note that in an example embodiment, the transmission of the small packet via the frequency interlace may be performed without first performing channel sensing or LBT, and thus, may result in decreased latency. This is because portions of the channel have been allocated (e.g., for a specific scheduling period) to different users or nodes based on different frequency interlaces being allocated or assigned to different network nodes, for example, and thus, the LBT may not be necessary for channel allocation among different network nodes (e.g., the allocation of different frequency interlaces among different network nodes or users may sufficiently provide channel allocation among different nodes or users). On the other hand, transmission via the contiguous wideband frequency resources (e.g., via wider band resources, or shared resources, such as a system bandwidth or BWP) may require that channel sensing or LBT be performed first before transmission, e.g., since the BWP or system bandwidth may be shared among multiple network nodes for transmission.

If, at 316, the packet size is larger than the size threshold, then flow proceeds to block 320. At 320, the network node may perform channel sensing or LBT, and then at 322 the network node may transmit the data packet via a transmit beam using a contiguous wideband frequency resources (e.g., such as the system bandwidth or a bandwidth part), e.g., where the contiguous wideband frequency resources may be wider in frequency (or occupy a wider bandwidth) than a total frequency range or total bandwidth of the plurality of distributed frequency resource portions of the frequency interlace). Thus, for example, the contiguous wideband frequency resources may be contiguous (e.g., not distributed resource portions, such as for an interlace), and may provide a greater amount of frequency resources than the frequency interlace, e.g., to accommodate transmission of a large (or larger) packet within one scheduling period, wherein such large packet could not be transmitted within a frequency interlace during one scheduling period. Thus, in case the packet to be transmitted is small enough (e.g., having a size less than the size threshold), the packet can be transmitted using the configured frequency interlace resources. In case the packet is larger (e.g., won't fit within the frequency interlace for one scheduling period), then LBT or channel sensing may be performed, and if the channel is unoccupied, the packet may be transmitted via the whole bandwidth (e.g., system bandwidth of BWP).

Also, according to an example embodiment, to avoid collision between large packets sent via the contiguous wideband frequency resources and small packets sent via a frequency interlace, from different gNBs, further coordination may be used. This can be done, for example, by reserving different time slots within a scheduling period (or by allocating different scheduling periods, or different slots, or different symbols) for small and large data packets. For example, a specific coordinated frame format could be used, that allocates different times for transmission of small packets (via frequency interlaces) and large packets (via the system bandwidth or other contiguous wideband frequency resources), to avoid interference. Alternately, the LBT for large data packet can be slightly delayed compared to transmission time of the small data packets, to allow small data packets to be transmitted first without having to perform LBT. And, thus, in such case, the large packet would be transmitted (via contiguous wideband frequency resources) if another node is not already transmitting a smaller packet via a frequency interlace. This may provide the added advantage that small IoT packets (e.g., requiring lower latency) may be given a higher transmission priority than the larger packets.

Figure 4:
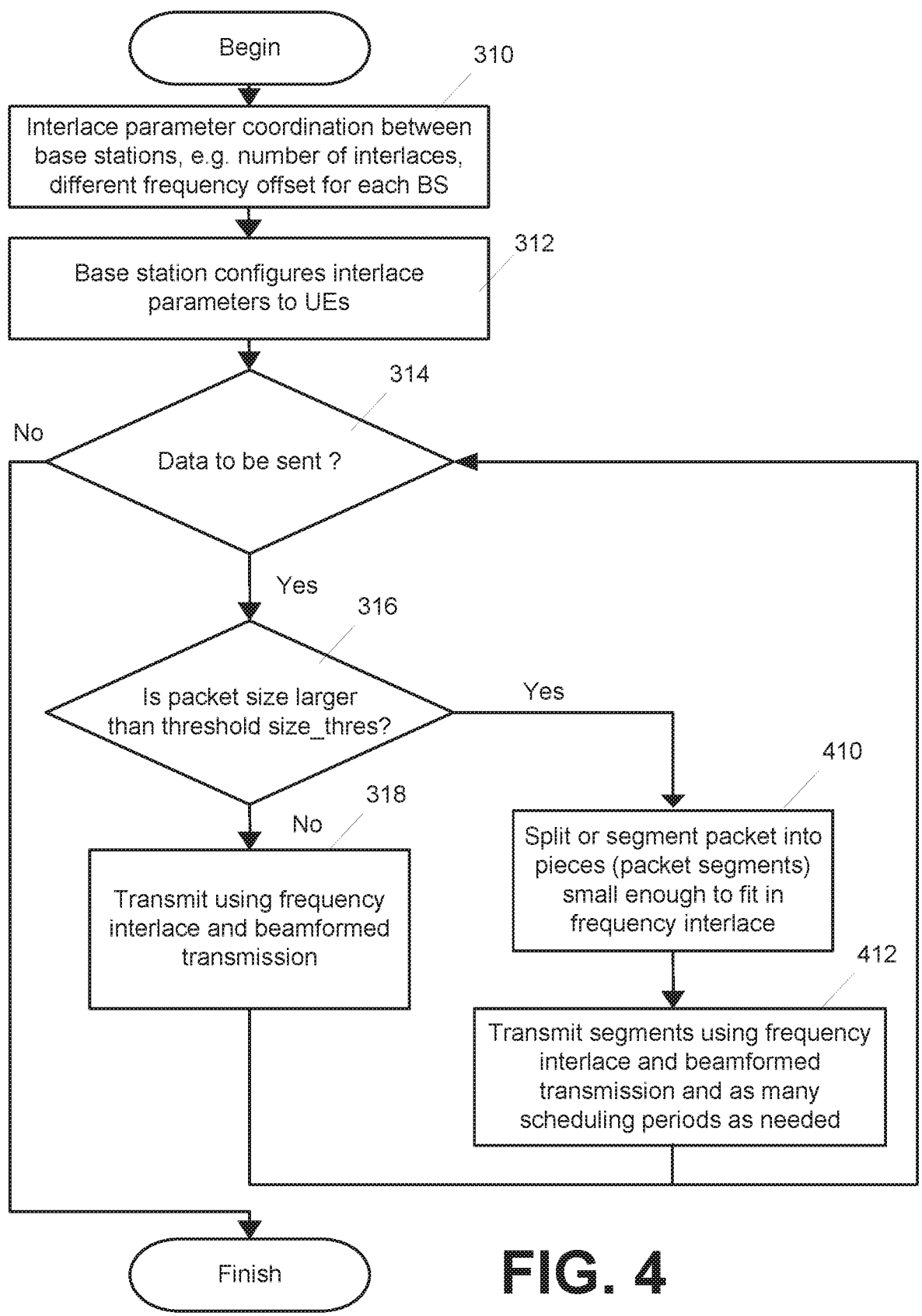
FIG. 4 is a flow chart illustrating operation of a network node according to another example embodiment.

FIG. 4 is a flow chart illustrating operation of a network node according to another example embodiment. Operations at blocks 310, 312, 314, 316, and 318 of FIG. 4 may be very similar or the same as those same blocks or operations shown in FIG. 3. Although, at block 314 of FIG. 4, the network node may determine if there is data to be transmitted for a user at a cell edge, e.g., which may be power limited, or which may require a higher SNR or SINR (where SNR or SINR may be improved by transmitting multiple smaller packets, rather than transmitting one large packet) or by transmitting using smaller bandwidth or interlaced transmission. At 316 of FIG. 4, if the packet size is greater than the size threshold, then at 410 the network node may segment or split the data packet into multiple packet segments, e.g., where each packet segment may fit within the resources of the frequency interlace for one scheduling period. At 412, the network node may transmit the packet segments via the distributed frequency resource portions of the frequency interlace for a number of corresponding scheduling periods, based on the number of packet segments to be transmitted. For example, a packet may be segmented into a first packet segment, a second packet segment and a third packet segment. The first packet segment may be transmitted via the frequency interlace during a first scheduling period; the second packet segment may be transmitted via the frequency interlace during a second/subsequent scheduling period; and the third packet segment may be transmitted via the frequency interlace during a third/subsequent scheduling period, etc. Note, that according to an example embodiment, the packet segments may be transmitted via the frequency interlace, e.g., without first performing LBT or channel sensing for each packet segment transmission during each scheduling period. Also. frequency hopping of interlaces may be used to obtain additional reliability for small packet transmission.

Some further example advantages may include:
Improved efficiency of small packet transmission;
Enhanced coverage;
Additional reliability for small packets;
No need for new coding methods or use of repetition on top of used modulation.

Figure 5:
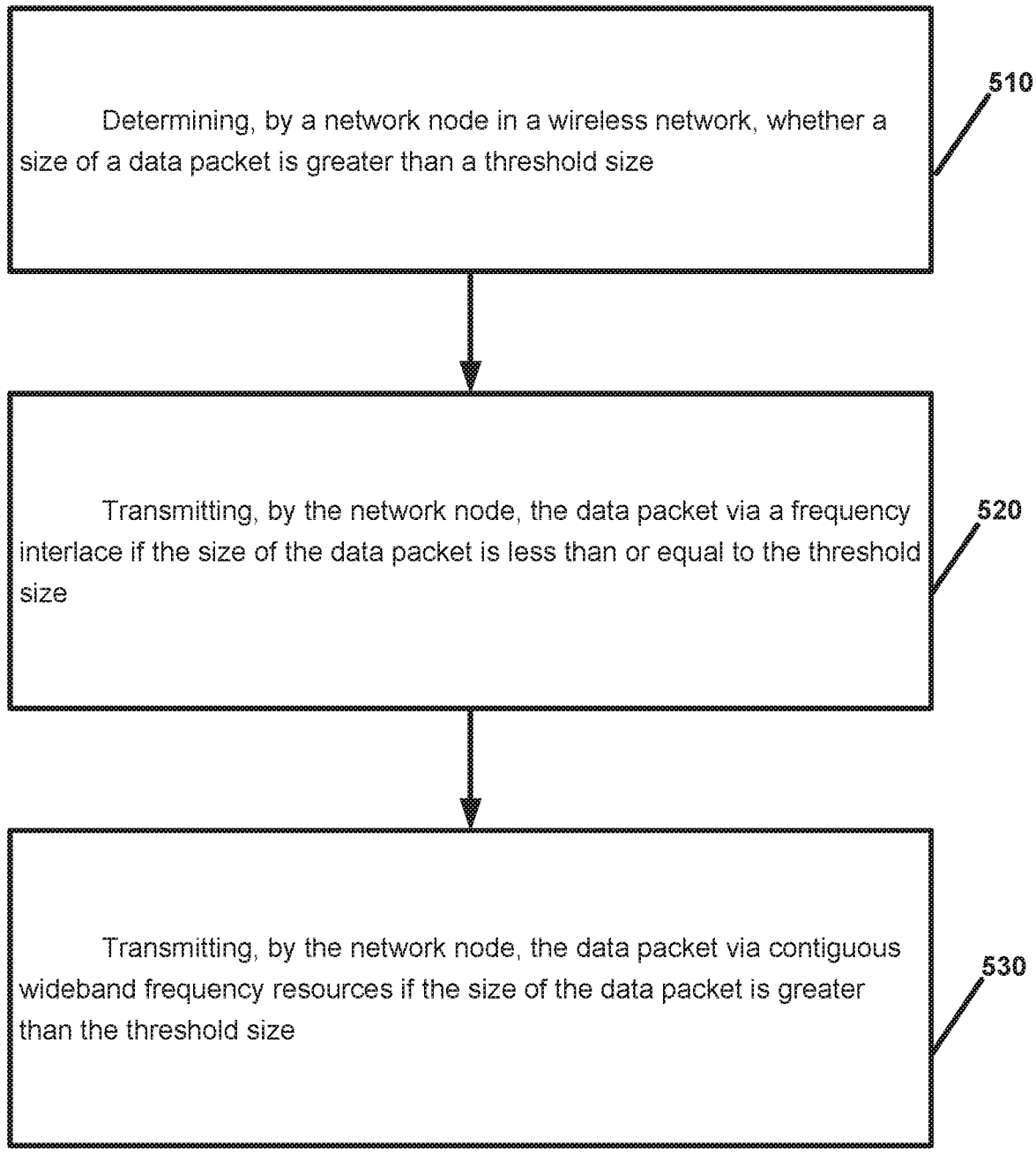
FIG. 5 is a flow chart illustrating operation of a network node according to another example embodiment.

Example 1. FIG. 5 is a flow chart illustrating operation of a network node according to an example embodiment. Operation 510 includes determining, by a network node in a wireless network, whether a size of a data packet is greater than a threshold size. Operation 520 includes transmitting, by the network node, the data packet via a frequency interlace if the size of the data packet is less than or equal to the threshold size. And, operation 530 includes transmitting, by the network node, the data packet via contiguous wideband frequency resources if the size of the data packet is greater than the threshold size.

Example 2. The method of example 1, wherein: the transmitting, by the network node, the data packet via a frequency interlace comprises: transmitting the data packet, via a plurality of distributed frequency resource portions of the frequency interlace, during a scheduling period, if the size of the data packet is less than or equal to the threshold size; the transmitting, by the network node, the data packet via contiguous wideband frequency resources comprises: performing channel sensing to confirm that a channel is idle; and transmitting the data packet via the contiguous wideband frequency resources during a scheduling period, wherein the contiguous wideband frequency resources are wider in frequency than a total frequency width of the plurality of frequency resource portions of the frequency interlace.

Example 3. The method of any of examples 1-2, further comprising: determining, by the network node in the wireless network, a configuration of the frequency interlace, wherein the frequency interlace includes the plurality of distributed frequency resource portions, each frequency resource portion provided at a different frequency location within a system bandwidth.

Example 4. The method of any of examples 1-3 wherein the transmitting the data packet via the frequency interlace is performed via a beamformed transmission without first performing channel sensing.

Example 5. The method of any of examples 1-4, wherein the network node comprises one of: a user device or user equipment (UE); or a base station or gNB.

Example 6. The method of any of examples 1-5 wherein the wideband frequency resources comprise all of the frequency resources of the system bandwidth or a bandwidth part.

Example 7. The method of any of examples 2-6, wherein the threshold size comprises a maximum size of data that can be transmitted at a target code rate via the plurality of distributed frequency resource portions of the frequency interlace during a scheduling period.

Example 8. The method of any of examples 2-7, wherein the scheduling period comprises at least one of: one or more symbols; one or more slots, wherein each slot includes a plurality of symbols.

Example 9. The method of any of examples 3-8, wherein the determining a configuration of a frequency interlace comprises: receiving, by the network node from another network node, information identifying the configuration of the frequency interlace or information indicating one or more parameters of the configuration of the frequency interlace.

Example 10. The method of any of examples 3-9, wherein the network node comprises a user device, wherein the determining a configuration of a frequency interlace comprises: receiving, by the user device from a base station, information identifying the configuration of the frequency interlace or information indicating one or more parameters of the configuration of the frequency interlace.

Example 11. The method of any of examples 3-10 wherein the determining a configuration of a frequency interlace comprises: sending, by the network node to a user device, information identifying the configuration of the frequency interlace or information indicating one or more parameters of the configuration of the frequency interlace.

Example 12. The method of any of examples 3-11, wherein the network node comprises a base station, and wherein the determining a configuration of a frequency interlace comprises: selecting, by the base station, the configuration of the frequency interlace, of a plurality of frequency interlace configurations.

Example 13. The method of any of examples 3-12, wherein the network node comprises a first base station, the method further comprising: communicating, by the first base station with at least a second base station of the wireless network, to coordinate the configuration of the frequency interlace.

Example 14. An apparatus comprising means for performing the method of any of examples 1-13.

Example 15. A non-transitory computer-readable storage medium comprising instructions stored thereon that, when executed by at least one processor, are configured to cause a computing system to perform the method of any of examples 1-13.

Example 16. An apparatus comprising: at least one processor; and at least one memory including computer program code; the at least one memory and the computer program code configured to, with the at least one processor, cause the apparatus at least to perform the method of any of claims 1-13.

Figure 6:
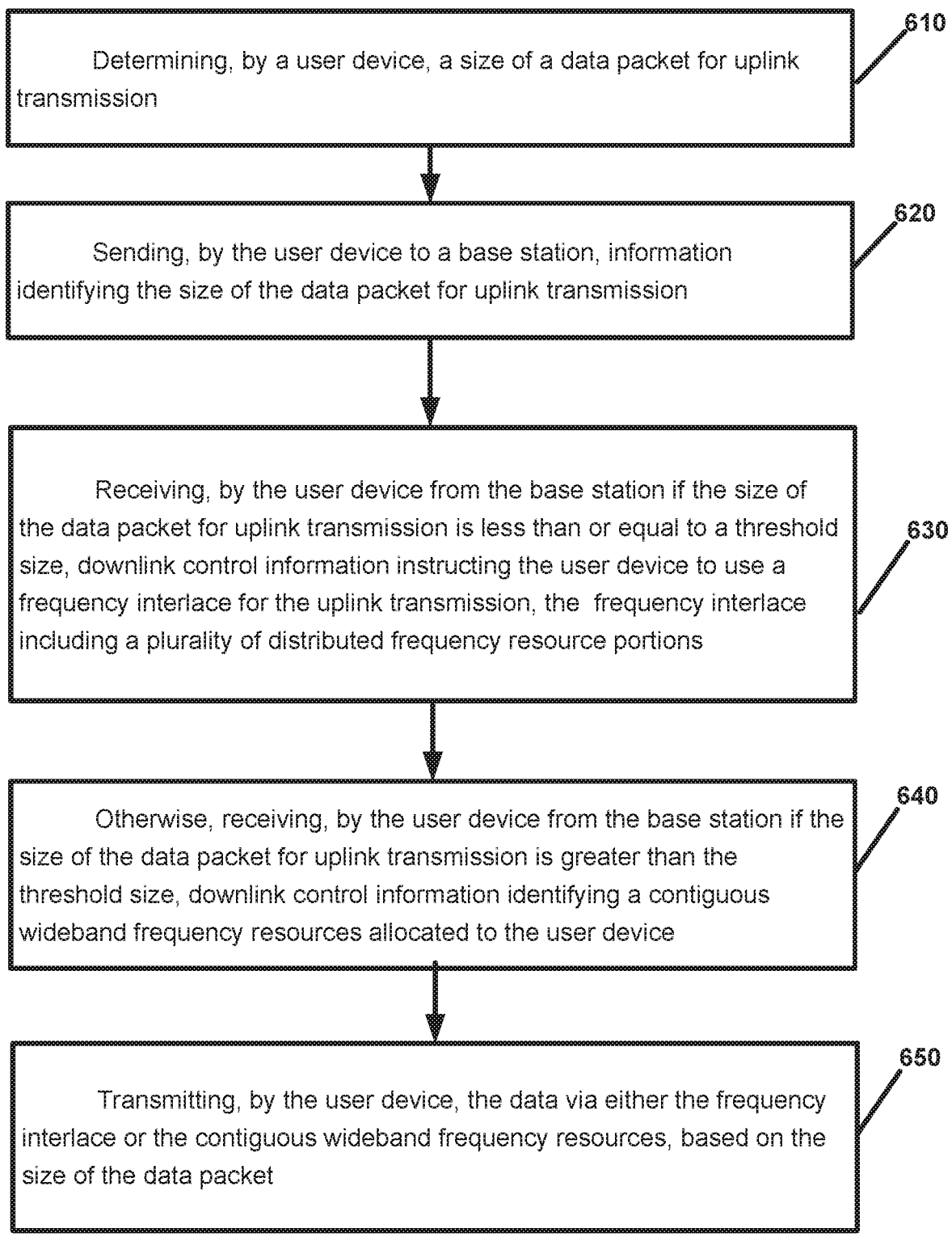
FIG. 6. is a flow chart illustrating operation of a user device according to an example embodiment.

Example 17. FIG. 6. is a flow chart illustrating operation of a user device according to an example embodiment. Operation 610 includes determining, by a user device, a size of a data packet for uplink transmission. Operation 620 includes sending, by the user device to a base station, information identifying the size of the data packet for uplink transmission. Operation 630 includes receiving, by the user device from the base station if the size of the data packet for uplink transmission is less than or equal to a threshold size, downlink control information instructing the user device to use a frequency interlace for the uplink transmission, the frequency interlace including a plurality of distributed frequency resource portions. Operation 640 includes otherwise, receiving, by the user device from the base station if the size of the data packet for uplink transmission is greater than the threshold size, downlink control information identifying a contiguous wideband frequency resources allocated to the user device. And, operation 650 includes transmitting, by the user device, the data via either the frequency interlace or the contiguous wideband frequency resources, based on the size of the data packet.

Example 18. The method of example 17, wherein the receiving, by the user device from the base station if the size of the data packet for uplink transmission is less than or equal to a threshold size comprises: receiving, by the user device from the base station if the size of the data packet for uplink transmission is less than or equal to a threshold size, downlink control information identifying resources allocated to the user device for the frequency interlace for the uplink transmission.

Example 19. The method of example 18, wherein the resources allocated to the user device for a frequency interlace that includes a plurality of distributed frequency resource portions are sufficient to allow the uplink transmission of the data packet within one scheduling period.

Example 20. The method of any of examples 17-19, wherein the threshold size comprises a maximum size of data that can be transmitted at a target code rate via the plurality of distributed frequency resource portions of the frequency interlace during a scheduling period.

Example 21. The method of any of examples 17-20, wherein the scheduling period comprises at least one of: one or more symbols; or, one or more slots, wherein each slot includes a plurality of symbols.

Example 22. An apparatus comprising means for performing the method of any of examples 17-21.

Example 23. A non-transitory computer-readable storage medium comprising instructions stored thereon that, when executed by at least one processor, are configured to cause a computing system to perform the method of any of examples 17-21.

Example 24. An apparatus comprising: at least one processor; and at least one memory including computer program code; the at least one memory and the computer program code configured to, with the at least one processor, cause the apparatus at least to perform the method of any of examples 17-21.

Figure 7:
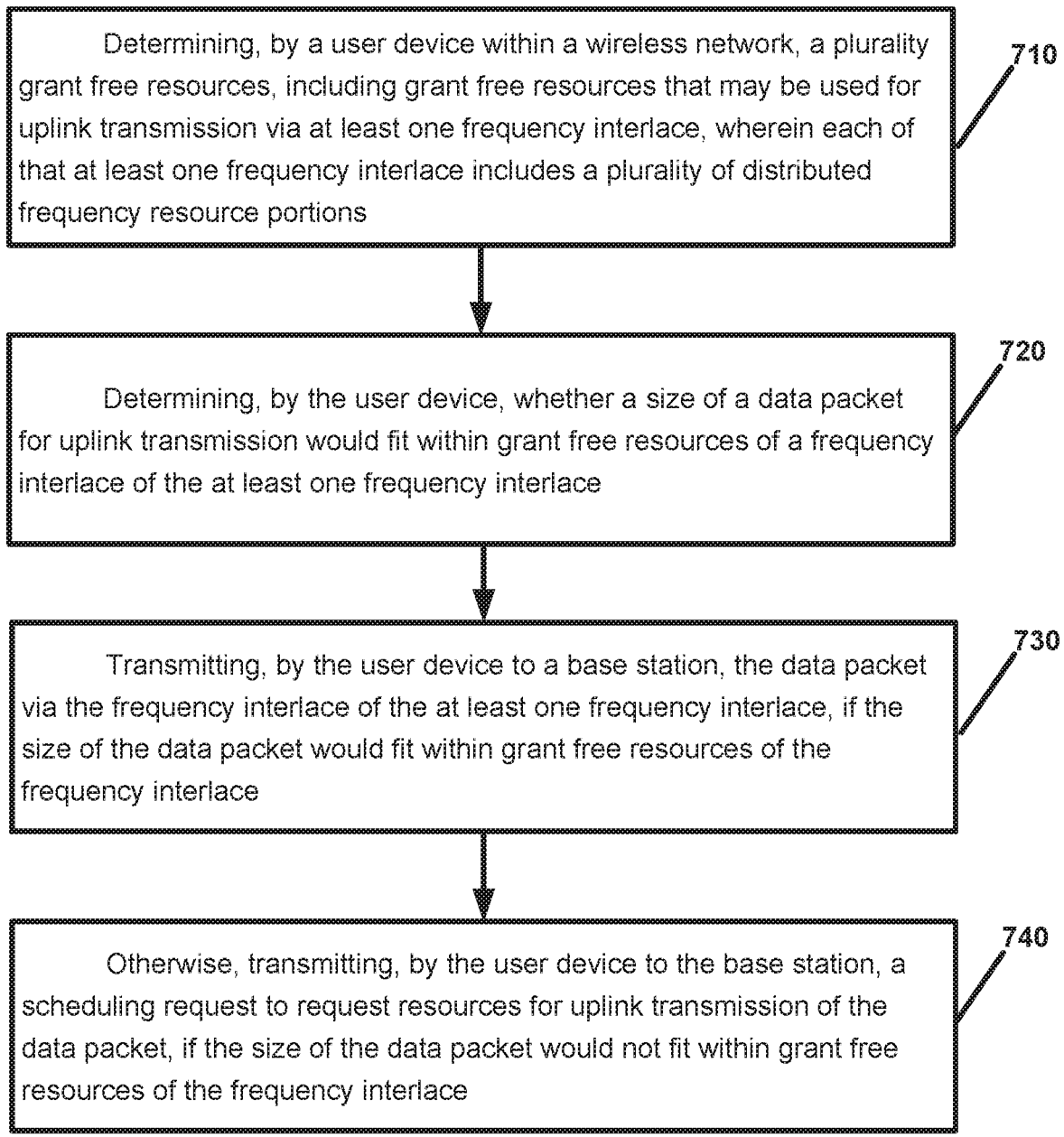
FIG. 7 is a flow chart illustrating operation of a user device according to an example embodiment.

Example 25. FIG. 7 is a flow chart illustrating operation of a user device according to an example embodiment. Operation 710 includes determining, by a user device within a wireless network, a plurality grant free resources, including grant free resources that may be used for uplink transmission via at least one frequency interlace, wherein each of that at least one frequency interlace includes a plurality of distributed frequency resource portions. Operation 720 includes determining, by the user device, whether a size of a data packet for uplink transmission would fit within grant free resources of a frequency interlace of the at least one frequency interlace. Operation 730 includes transmitting, by the user device to a base station, the data packet via the frequency interlace of the at least one frequency interlace, if the size of the data packet would fit within grant free resources of the frequency interlace. And, operation 740 includes otherwise, transmitting, by the user device to the base station, a scheduling request to request resources for uplink transmission of the data packet, if the size of the data packet would not fit within grant free resources of the frequency interlace.

Example 26. The method of example 25, wherein the scheduling request includes an indication of the size of the data packet for uplink transmission.

Example 27. The method of any of examples 25-26, further comprising:

receiving, by the user device from the base station, an allocation of resources for uplink transmission, in response to the scheduling request.

Example 28. An apparatus comprising means for performing the method of any of examples 25-27.

Example 29. A non-transitory computer-readable storage medium comprising instructions stored thereon that, when executed by at least one processor, are configured to cause a computing system to perform the method of any of examples 25-27.

Example 30. An apparatus comprising: at least one processor; and at least one memory including computer program code; the at least one memory and the computer program code configured to, with the at least one processor, cause the apparatus at least to perform the method of any of examples 25-27.

Figure 8:
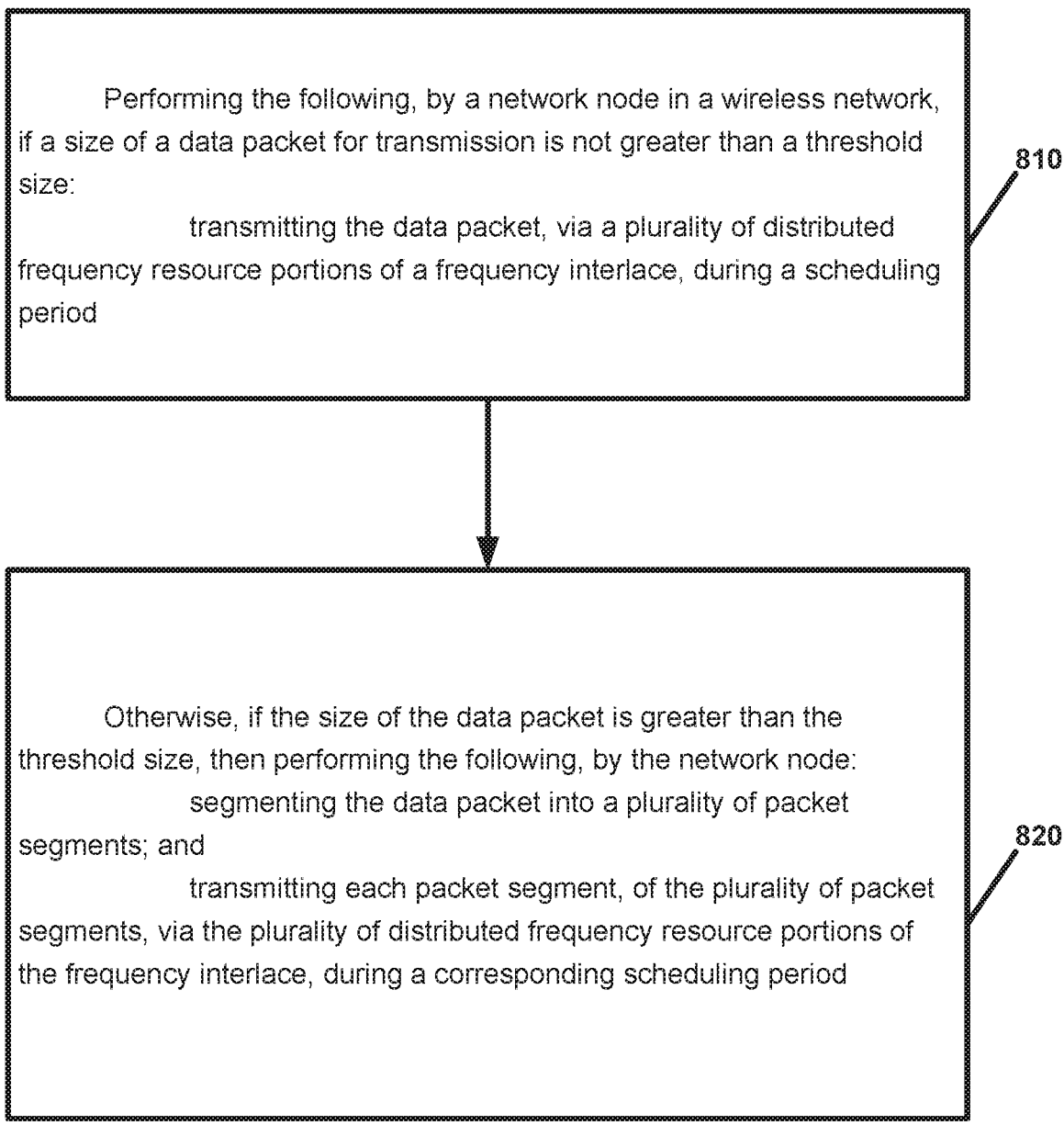
FIG. 8 is a flow chart illustrating operation of a network node according to another example embodiment.

Example 31. FIG. 8 is a flow chart illustrating operation of a network node according to an example embodiment. Operation 810 includes performing the following, by a network node in a wireless network, if a size of a data packet for transmission is not greater than a threshold size: transmitting the data packet, via a plurality of distributed frequency resource portions of a frequency interlace, during a scheduling period. Operation 820 includes otherwise, if the size of the data packet is greater than the threshold size, then performing the following, by the network node: segmenting the data packet into a plurality of packet segments; and transmitting each packet segment, of the plurality of packet segments, via the plurality of distributed frequency resource portions of the frequency interlace, during a corresponding scheduling period.

Example 32. The method of example 31, further comprising: determining, by the network node in the wireless network, a configuration of the frequency interlace, wherein the frequency interlace includes the plurality of distributed frequency resource portions, each frequency resource portion provided at a different frequency location within a system bandwidth.

Example 33. The method of any of examples 31-32 wherein the transmitting the data packet, via the plurality of distributed frequency resource portions of the frequency interlace, is performed via a beamformed transmission without first performing channel sensing.

Example 34. The method of any of examples 31-33, wherein the network node comprises one of: a user device or user equipment (UE); or a base station or gNB.

Example 35. The method of any of examples 31-34, wherein the threshold size comprises a maximum size of data that can be transmitted at a target code rate via the plurality of distributed frequency resource portions of the frequency interlace during a scheduling period.

Example 36. The method of any of examples 31-35, wherein the scheduling period comprises at least one of: one or more symbols; or one or more slots, wherein each slot includes a plurality of symbols.

Example 37. The method of any of examples 31-36, wherein transmitting each packet segment comprises: transmitting, via a transmit beam or beamforming transmission, each packet segment, of the plurality of packet segments, via the plurality of distributed frequency resource portions of the frequency interlace, during a corresponding scheduling period, including at least the following: transmitting a first packet segment of the data packet via the plurality of distributed frequency resource portions of the frequency interlace during a first scheduling period; and transmitting a second packet segment of the data packet via the plurality of distributed frequency resource portions of the frequency interlace during a second scheduling period.

Example 38. The method of any of examples 31-37, wherein the determining a configuration of a frequency interlace comprises: receiving, by the network node from another network node, information identifying the configuration of the frequency interlace or information indicating one or more parameters of the configuration of the frequency interlace.

Example 39. The method of any of examples 31-38 wherein the determining a configuration of a frequency interlace comprises: sending, by the network node to a user device, information identifying the configuration of the frequency interlace or information indicating one or more parameters of the configuration of the frequency interlace.

Example 40. The method of any of examples 31-39, wherein the network node comprises a base station, and wherein the determining a configuration of a frequency interlace comprises: selecting, by the base station, the configuration of the frequency interlace, of a plurality of frequency interlace configurations.

Example 41. The method of any of examples 31-40, wherein the network node comprises a first base station, the method further comprising: communicating, by the first base station with at least a second base station of the wireless network, to coordinate the configuration of the frequency interlace.

Example 42. The method of any of examples 31-41, wherein the network node comprises a user device, wherein the determining a configuration of a frequency interlace comprises: receiving, by the user device from a base station, information identifying the configuration of the frequency interlace or information indicating one or more parameters of the configuration of the frequency interlace.

Example 43. The method of any of examples 31-42, wherein the network device comprises a user device, the method further comprising: sending, by the user device to a base station, information identifying the size of the data packet; receiving, by the user device from the base station, downlink control information identifying resources allocated to the user device for the frequency interlace that includes the plurality of distributed frequency resource portions.

Example 44. An apparatus comprising means for performing the method of any of examples 31-43.

Example 45. A non-transitory computer-readable storage medium comprising instructions stored thereon that, when executed by at least one processor, are configured to cause a computing system to perform the method of any of examples 31-43.

Example 46. An apparatus comprising: at least one processor; and at least one memory including computer program code; the at least one memory and the computer program code configured to, with the at least one processor, cause the apparatus at least to perform the method of any of examples 31-43.

Figure 9:
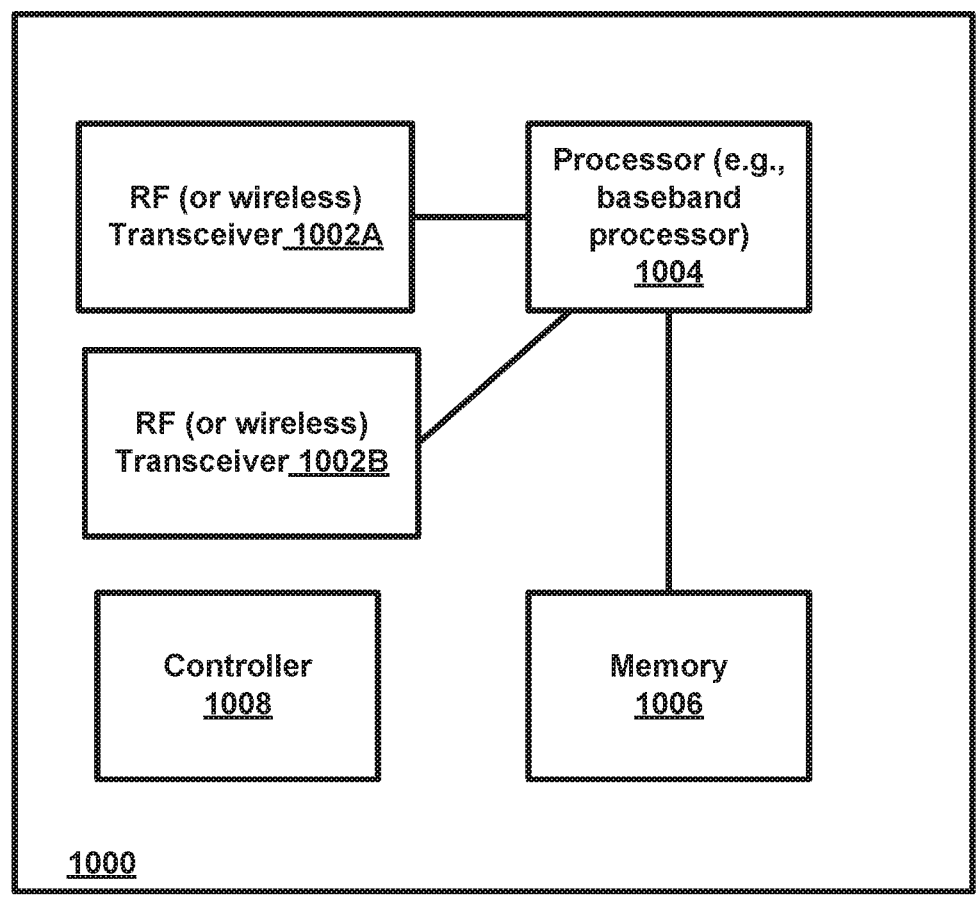
FIG. 9 is a block diagram of a wireless station or network node (e.g., AP, BS, RAN node, gNB, UE or user device, or other network node) according to an example embodiment.

FIG. 9 is a block diagram of a wireless station or network node (e.g., AP, BS, gNB or user device/UE, or other network node) 1000 according to an example embodiment. The wireless station 1000 may include, for example, one or more (e.g., two as shown in FIG. 9) RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 9, a controller (or processor) 1008 may execute software and instructions, and may provide overall control for the station 1000, and may provide control for other systems not shown in FIG. 9, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example embodiment, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method, comprising:
    determining, by a network node in a wireless network, whether a size of a data packet is greater than a threshold size;
    transmitting, by the network node, the data packet via a frequency interlace if the size of the data packet is less than or equal to the threshold size; and
    transmitting, by the network node, the data packet via contiguous wideband frequency resources if the size of the data packet is greater than the threshold size,
    wherein the transmitting the data packet via the frequency interlace is performed via a beamformed transmission without first performing channel sensing.

2. The method of claim 1, wherein:
    the transmitting, by the network node, the data packet via a frequency interlace comprises:
    transmitting the data packet, via a plurality of distributed frequency resource portions of the frequency interlace, during a scheduling period, if the size of the data packet is less than or equal to the threshold size;
    the transmitting, by the network node, the data packet via contiguous wideband frequency resources comprises:
    performing channel sensing to confirm that a channel is idle; and
    transmitting the data packet via the contiguous wideband frequency resources during a scheduling period, wherein the contiguous wideband frequency resources are wider in frequency than a total frequency width of the plurality of frequency resource portions of the frequency interlace.

3. The method of claim 1, further comprising:
    determining, by the network node in the wireless network, a configuration of the frequency interlace, wherein the frequency interlace includes the plurality of distributed frequency resource portions, each frequency resource portion provided at a different frequency location within a system bandwidth.

4. The method of claim 3, wherein the network node comprises one of:
    a user device or user equipment (UE); or
    a base station or gNB.

5. The method of claim 4, wherein the wideband frequency resources comprise all of the frequency resources of the system bandwidth or a bandwidth part.

6. The method of claim 5, wherein the threshold size comprises a maximum size of data that can be transmitted at a target code rate via the plurality of distributed frequency resource portions of the frequency interlace during a scheduling period.

7. The method of claim 6, wherein the scheduling period comprises at least one of:
    one or more symbols;
    one or more slots, wherein each slot includes a plurality of symbols.

8. The method of claim 7, wherein the determining a configuration of a frequency interlace comprises:
    receiving, by the network node from another network node, information identifying the configuration of the frequency interlace or information indicating one or more parameters of the configuration of the frequency interlace.

9. The method of claim 8, wherein the network node comprises a user device, wherein the determining a configuration of a frequency interlace comprises:
receiving, by the user device from a base station, information identifying the configuration of the frequency interlace or information indicating one or more parameters of the configuration of the frequency interlace.

10. The method of any of claim 8, wherein the determining a configuration of a frequency interlace comprises:
sending, by the network node to a user device, information identifying the configuration of the frequency interlace or information indicating one or more parameters of the configuration of the frequency interlace.

11. The method of claim 10, wherein the network node comprises a base station, and wherein the determining a configuration of a frequency interlace comprises:
selecting, by the base station, the configuration of the frequency interlace, of a plurality of frequency interlace configurations.

12. The method of claim 11, wherein the network node comprises a first base station, the method further comprising:
communicating, by the first base station with at least a second base station of the wireless network, to coordinate the configuration of the frequency interlace.

13. An apparatus comprising:
at least one processor; and
at least one memory including computer program code, the at least one memory and the computer program code being configured to, with the at least one processor, cause the apparatus at least to perform the method of claim 1.

14. A method, comprising:
determining, by a user device, a size of a data packet for uplink transmission;
sending, by the user device to a base station, information identifying the size of the data packet for uplink transmission;
receiving, by the user device from the base station if the size of the data packet for uplink transmission is less than or equal to a threshold size, downlink control information instructing the user device to use a frequency interlace for the uplink transmission, the frequency interlace including a plurality of distributed frequency resource portions;
otherwise, receiving, by the user device from the base station if the size of the data packet for uplink transmission is greater than the threshold size, downlink control information identifying a contiguous wideband frequency resources allocated to the user device; and
transmitting, by the user device, the data via either the frequency interlace or the contiguous wideband frequency resources, based on the size of the data packet, wherein the threshold size comprises a maximum size of data that can be transmitted at a target code rate via the plurality of distributed frequency resource portions of the frequency interlace during a scheduling period.

15. The method of claim 14, wherein the receiving, by the user device from the base station if the size of the data packet for uplink transmission is less than or equal to a threshold size comprises:
receiving, by the user device from the base station if the size of the data packet for uplink transmission is less than or equal to a threshold size, downlink control information identifying resources allocated to the user device for the frequency interlace for the uplink transmission.

16. The method of claim 15, wherein the resources allocated to the user device for a frequency interlace that includes a plurality of distributed frequency resource portions are sufficient to allow the uplink transmission of the data packet within one scheduling period.

17. The method of claim 14, wherein the scheduling period comprises at least one of:
one or more symbols;
one or more slots, wherein each slot includes a plurality of symbols.

18. A user device comprising
at least one processor; and
at least one memory including computer program code, the at least one memory and the computer program code being configured to, with the at least one processor, cause the user device at least to perform:
determining, by the user device, a size of a data packet for uplink transmission;
sending, by the user device to a base station, information identifying the size of the data packet for uplink transmission;
receiving, by the user device from the base station if the size of the data packet for uplink transmission is less than or equal to a threshold size, downlink control information instructing the user device to use a frequency interlace for the uplink transmission, the frequency interlace including a plurality of distributed frequency resource portions;
otherwise, receiving, by the user device from the base station if the size of the data packet for uplink transmission is greater than the threshold size, downlink control information identifying a contiguous wideband frequency resources allocated to the user device; and
transmitting, by the user device, the data via either the frequency interlace or the contiguous wideband frequency resources, based on the size of the data packet, wherein the threshold size comprises a maximum size of data that can be transmitted at a target code rate via the plurality of distributed frequency resource portions of the frequency interlace during a scheduling period.

\* \* \* \* \*